United States Patent [19]

Kaiser

[11] 4,283,743

[45] Aug. 11, 1981

[54] YOKE MOUNTING ASSEMBLY FOR A VIDEO CAMERA

[75] Inventor: Theodore Kaiser, Bensenville, Ill.

[73] Assignee: Motorola, Inc., Schaumburg, Ill.

[21] Appl. No.: 140,330

[22] Filed: Apr. 14, 1980

[51] Int. Cl.[3] .............................................. H04N 5/645

[52] U.S. Cl. ...................................... 358/248; 335/212

[58] Field of Search ................ 358/248, 249; 335/210, 335/211, 212, 213, 214

[56] References Cited

U.S. PATENT DOCUMENTS

| | | | |
|---|---|---|---|
| 1,256,550 | 2/1918 | Goold | 248/671 |
| 1,477,219 | 12/1923 | Halvorsen | 269/60 |
| 2,234,720 | 3/1941 | De Tar | 358/248 |
| 2,443,973 | 6/1948 | Asling | 358/248 |
| 2,528,973 | 11/1950 | Radman | 358/249 |
| 2,533,687 | 12/1950 | Quam | 335/211 |
| 2,581,657 | 1/1952 | Heppner | 335/212 |
| 3,186,705 | 6/1965 | Rodder | 74/527 |
| 3,321,577 | 5/1967 | Burke | 358/248 |
| 4,118,133 | 10/1978 | Küpfer | 339/75 R |

*Primary Examiner*—Howard Britton
*Attorney, Agent, or Firm*—Margaret Marsh Parker; James W. Gillman

[57] ABSTRACT

A yoke mounting assembly provides easy yoke adjustment along the axial direction of the tube with accurate, fixed positioning in the other two dimensions. An extruded sliding support is movable along projections in a housing frame against the applied normal force of a pair of C-shaped retainer springs, the latter being easily rotated to a release position for yoke or camera tube access.

5 Claims, 6 Drawing Figures

YOKE MOUNTING ASSEMBLY FOR A VIDEO CAMERA

BACKGROUND OF THE INVENTION

The present invention relates to the field of electron beam devices such as vidicon camera tubes and, more particularly, to easy, accurate and inexpensive adjustment means for the yoke coil of such a device.

In prior art cathode ray tube devices, and cameras using vidicon tubes, many mounting arrangements have been devised, usually utilizing various combinations of gimbal rings, set screws, tiltable mounting plates, and spring biased adjusting pins. Most such arrangements were developed to meet a need for three-dimensional adjustment and nearly all rquire a considerable amount of disassembly for effecting vidicon tube or yoke replacement. In some cases, a considerable amount of readjustment was required upon reassembly. Even those devices which require adjustment on only one axis utilize expensive gearing systems, or housing/frame structures which do not allow for simple, yet accurate yoke adjustment.

SUMMARY OF THE INVENTION

It is an object of the present invention to provide a simple means of adjusting the axial position of the yoke coil assembly of a cathode ray tube while the position relative to the perpendicular directions is unchanged.

It is a particular object to provide extremely accurate adjustment and positioning with relatively inexpensive components.

It is also a particular object to provide for such adjustment and, at the same time, provide for easy access to the yoke assembly and the tube.

These objects and others are obtained in the structure of the present invention which provides accurate and fixed positioning in two dimensions by means of a die-cast housing frame and an extruded sliding support which are not movable (in those two dimensions) with respect to each other after being locked into position. Axial motion is produced by a threaded portion of the sliding support which mates with an interiorly threaded adjusting screw, the screw being rotatably retained in the housing frame. The support can then slide axially upon two rails of the housing frame and is biased against the rails by two retainer springs. These C-shaped springs prevent motion of the support in two dimensions, allow for the required axial movement of the support, and are easily rotated out of contact with the support when replacement of yoke coil or tube is necessary.

DETAILED DESCRIPTION OF THE PREFERRED EMBODIMENT

Figure 1:
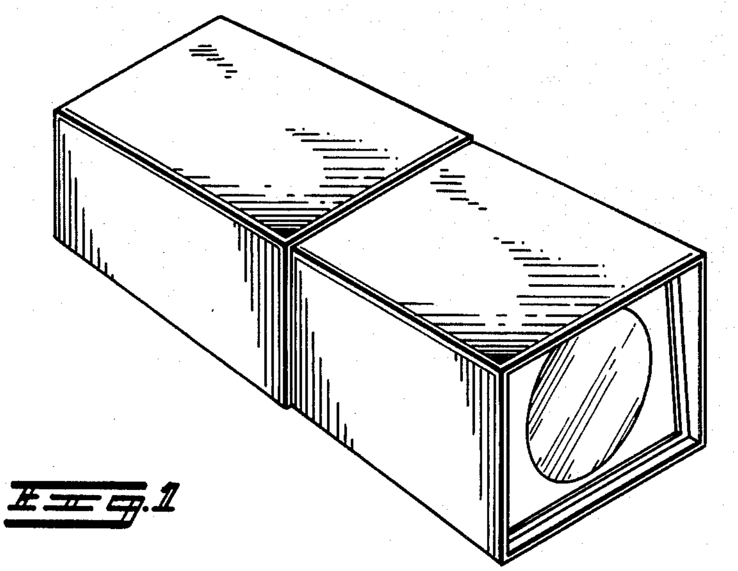
FIG. 1 is a perspective, exterior view of a camera such as could utilize the invention.

The camera of FIG. 1 is of the type normally used for surveillance in a closed circuit TV system and would usually contain a vidicon camera tube (not shown). The present invention is particularly suited to such a CRT device, but there is no intent to limit the invention other than those limitations in the appended claims. In such a device, the vidicon tube is mounted within an outer housing (typically waterproof) along with all associated circuitry. The vidicon tube is a scanning camera tube which utilizes a photoconducting material as the light-sensitive element and image storage medium. Light from the scene being viewed comes through an external lens and a glass face plate and impinges on a screen of the light-sensitive material on the rear surface of the face plate. Light on an element of the screen reduces the conductivity of that element and a charge pattern is built up between scans which is proportional to the amount of light on the respective elements. An electron beam is very sharply focused at the screen by the action of a focusing coil and accelerating electrodes. The beam is deflected both horizontally and vertically to form a raster pattern by the action of a deflection or yoke coil. Obviously, the position of the yoke coil with respect to the vidicon tube will affect the focusing of the electron beam on the screen and, with a present day vidicon tube, the yoke must be accurately positioned with respect to all three axes but need be adjustable for any given tube in only the axial direction. Note: the "axial" direction as the term is used herein refers to the longitudinal axis of the CRT 9. The other two axes are, of course, at 90° to this "axial" direction and to each other.

Figure 3:
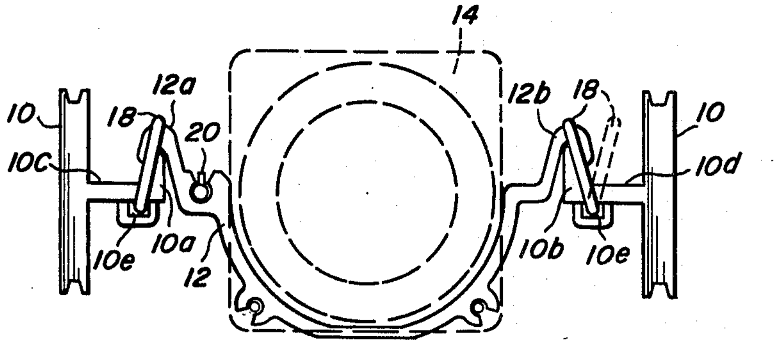
FIG. 3 is an elevation showing one end of the portion of FIG. 2.
Figure 2:
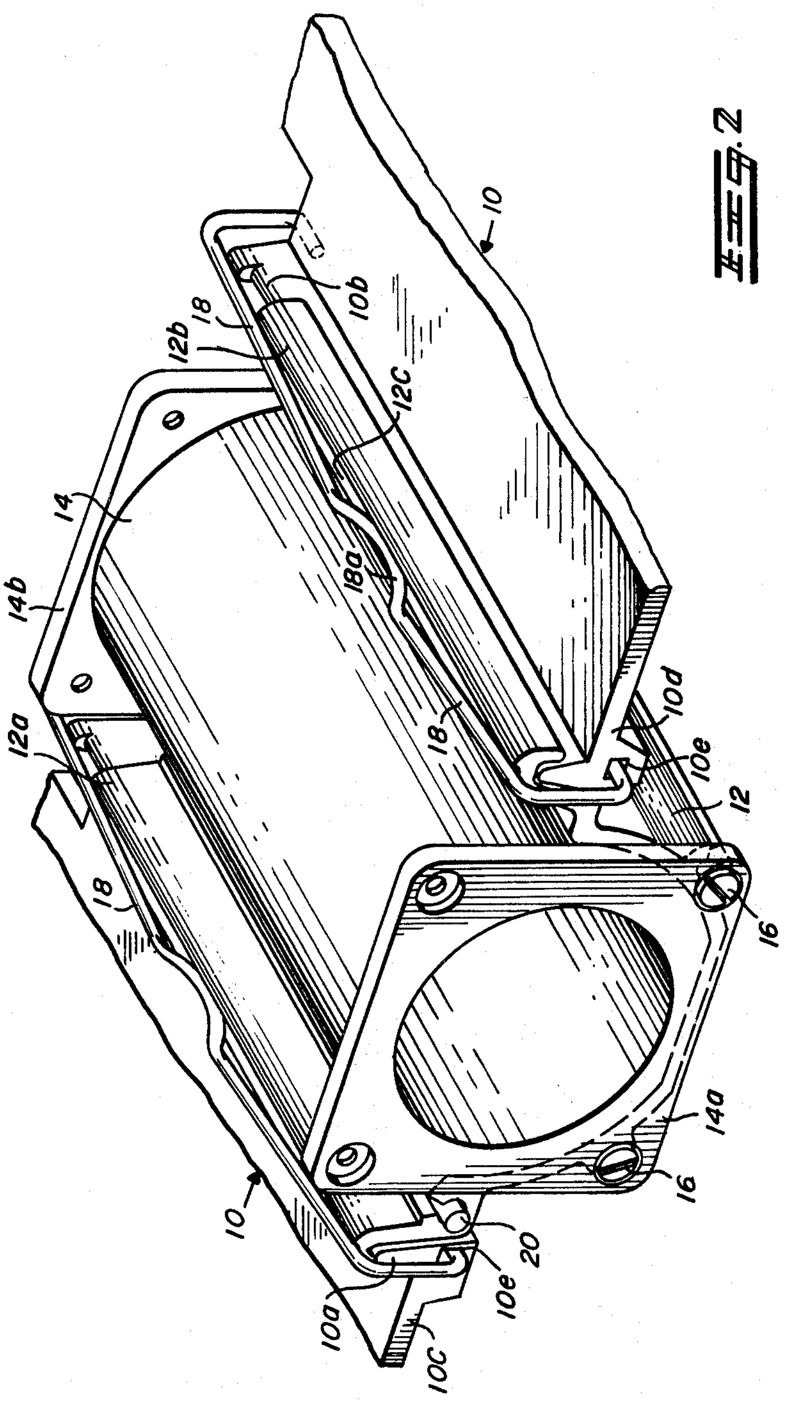
FIG. 2 is a perspective view of a portion of the interior of the camera of FIG. 1.

FIGS. 2 and 3 shown an interior perspective view of a portion of the camera of FIG. 1 and an elevation showing one end of that portion. Of the die-cast housing frame 10 (not seen in its entirety), two rails **10*a*, 10*b* may be seen, along with webs 10*c*, 10*d* which are integrally formed with and support the rails. Supported upon the rails 10*a*, 10*b* is a sliding support 12 which is preferably an extruded member, formed of an aluminum alloy. In the exemplary embodiment, the support 12 would be on the order of 3.0 in.×1.5 in.×2.5 in. (7.6 cm.×3.8 cm.×6.4 cm.). On the sliding support 12 is a yoke coil assembly 14, including end plates 14*a*, 14*b* which are bolted to the sliding support 12 by four screws 16 (two visible) which are preferably self-tapping screws. Since the CRT is releasably supported by the housing frame 10, and the yoke coil assembly 14 is attached to the sliding support 12, movement of the sliding support will affect the electron beam of the CRT. Such adjustment may be necessary when the CRT is replaced in the device. Flanges 12*a*, 12*b* of the support 12 rest on the rails 10*a*, 10*b*, thus providing mechanical support and accurate, fixed positioning in the two dimensions which are at 90° to the axial motion. This support is supplied by the rails 10*a*, 10*b* mating with the flanges 12*a*, 12*b*, and the positioning is maintained by two planar surfaces 12*f* in the under side of flange 12*a* (seen more clearly in FIG. 4). With proper tolerances in the die-cast housing frame and the extruded sliding support, the relative positions of these two members can easily be maintained within 0.015 in. (0.04 cm.). The flanges 12*a*, 12*b* of the sliding support 12 are tightly but releasably held on the rails 10*a*, 10*b* by two C-shaped retainer springs 18. The ends of each spring 18 are captivated by apertures 10*e* in the housing frame 10 and a rounded center poriton 18*a*** of each spring rests in a groove 12*c* in each of the flanges 12*a*, 12*b*. It will be seen that with the springs 18 in the position of FIG. 2, the sliding support 12 can only move in the axial direction with respect to the housing frame 10 whereas, by simply lifting each center portion 18*a* out of the respective groove 12*c*, the springs 18 may be pivoted to the release postions (one indicated by a dashed line in FIG. 3). In the release position, the sliding support 12 and yoke coil assembly 14 are merely resting on the housing frame 10.

Figure 4:
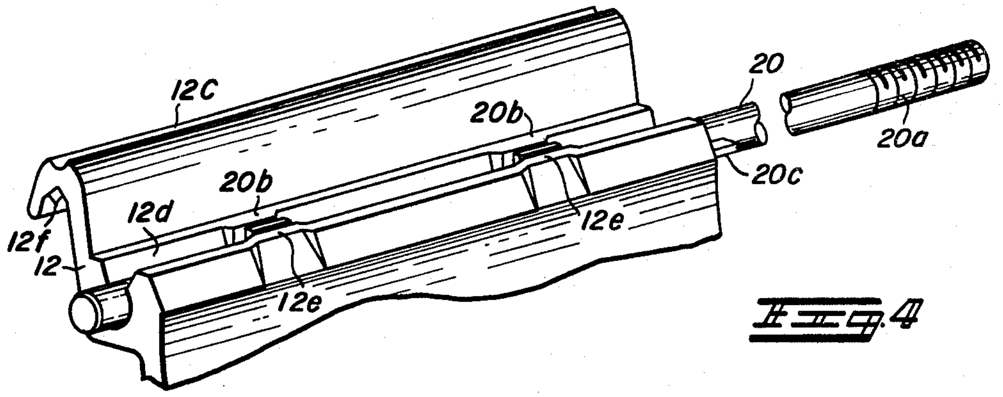
FIG. 4 is a perspective detail view of one portion of the assembly of FIGS. 2 and 3.

FIG. 4 shows in detail a drive rod 20, one end of which is visible in FIG. 2. The rod 20 is preferably formed of plated steel wire having, in this application, a diameter of approximately 0.14 in. (0.36 cm.) and is provided with a #6–32 thread at the second end 20*a*. The rod 20 fits into a mating slot 12*d* in the sliding support 12, and has swaged ears 20*b* to prevent rotation in the slot, and another pair of swaged ears 20*c* which serve as a stop for linear movement of the rod in the slot. During assembly of the sliding support 12, the rod 20 is laid into the slot 12*d* in the frontmost position and attached there. This attachment may be of a permanent nature as seen in FIG. 4 where portions 12*e* of the slot wall are swaged against the ears 20*b*. The drive rod 20 could, alternatively, be prevented from moving axially in the slot 12*d* by other means such as a retaining ring (not shown) placed on the front end of the rod adjacent the sliding support after being positioned. Also, if desired, the rod 20 could be integrally formed with the sliding support 12.

Figure 5:
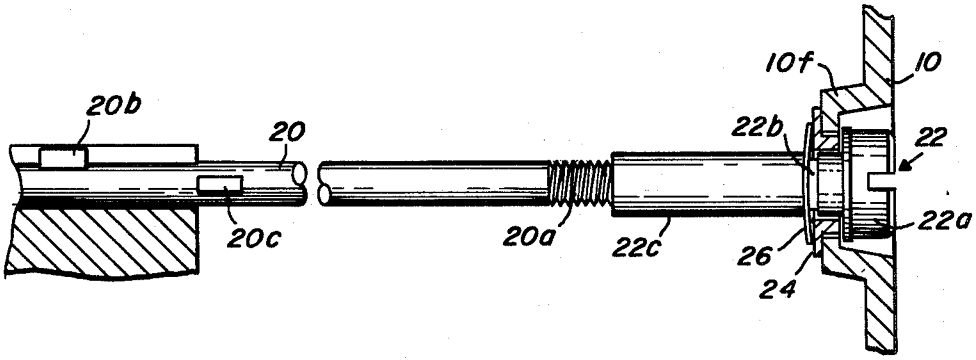
FIG. 5 is a partially cutaway view of another portion of the structure of FIGS. 2 and 3.

FIG. 5 shows the preferred method of utilizing the drive rod 20. A cutaway portion of the rear wall of the housing frame 10 is shown, including a stud 10*f*. An adjusting screw 22 is inserted through an aperture in the stud. The screw 22 includes a head 22*a*, a narrowed body portion 22*b*, and an internally threaded (#6–32) body portion 22*c* which mates with end 20*a* of the rod 20. The screw 22 is rotatably captivated in the stud 10*f* by a thrust bushing 24, inserted into the aperture in the stud, and by a bowed E-ring 26. It will be obvious that other means may be used to captivate the screw 22 or to cause the rotation of the drive rod 20. In order to replace the CRT, only a few simple steps are required; the socket (not shown) which is on a flexible cable is detached from the CRT, the E-ring 26 is removed, the adjusting screw 22 is unscrewed from the drive rod 20, and the center portions 18*a* of the retainer springs 18 are lifted out of the grooves 12*c*.

Figure 6:
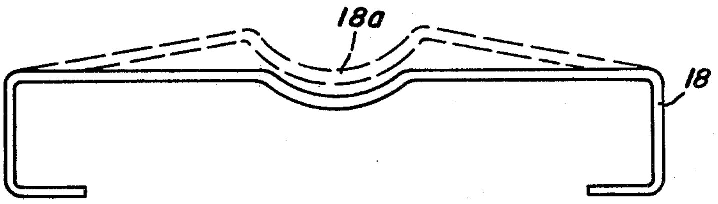
FIG. 6 is a view of one element of the assembly of FIGS. 2 and 3.

FIG. 6 shows one of the retainer springs 18 in its unstressed form and, in dashed lines, the shape of the spring in use; i.e., with the spring center portion 18*a* raised as by the surface of the groove 12*c*. The retainer springs 18 are formed of a very strong wire such as #23 piano wire which can apply to the support 12 a static force of over 15 pounds, or approximately 20 times the weight of the yoke coil assembly. A linear force of 4.3 pounds is required to move the assembly axially. It will be apparent that the springs 18 provide a measure of shock mounting for the yoke coil assembly 14.

I claim:

1. An adjustable mounting arrangement for the yoke coil assembly of a cathode ray tube device and comprising:

- housing means including rail means;
- supporting means slideably supported on the rail means for accurately positioning the yoke coil assembly relative to the CRT and including a first drive means;
- second drive means rotatably attached to the housing means for cooperating with the first drive means to slidingly move the supporting means relative to the housing means; and
- a pair of C-shaped retainer springs releasably attached to the housing means and adapted, in a first position, to bias the supporting means against the housing means and, in a second position, to release the supporting means.

2. An adjustable mounting arrangement as in claim 1 wherein the first drive means includes a threaded end portion and the second drive means includes an internally threaded screw means for mating with and causing actual movement of the first drive means.

3. An adjustable mounting arrangement as in claim 1 wherein the supporting means includes two grooves and each of the C-shaped retainer springs includes a center portion adapted to press against the respective groove means when the springs are in the first position.

4. An adjustable mounting arrangement as in claim 1 wherein the supporting means includes at least two planar surfaces for positioning one of the rail means with respect to the supporting means.

5. An adjustable mounting arrangement as in claim 1 wherein the first drive means comprises a wire rod and means for preventing rotation of the wire rod with respect to the housing means.

* * * * *